United States Patent [19]
Lewis

[11] Patent Number: 5,530,448
[45] Date of Patent: Jun. 25, 1996

[54] THREE-PULSE MTI WITHOUT BLIND SPEEDS

[75] Inventor: Bernard L. Lewis, Ft. Washington, Md.

[73] Assignee: The United States of America as represented by the Secretary of the Navy, Washington, D.C.

[21] Appl. No.: 559,062

[22] Filed: Dec. 5, 1983

[51] Int. Cl.$^6$ ............................ G01S 13/28; G01S 13/524
[52] U.S. Cl. ............................................. 342/132; 342/160
[58] Field of Search .................... 343/7.7, 17.2 PC; 342/132, 160

[56] References Cited

U.S. PATENT DOCUMENTS

| | | | |
|---|---|---|---|
| 3,225,349 | 12/1965 | Thor | 342/132 |
| 3,808,594 | 4/1974 | Cook et al. | 342/201 |
| 3,905,033 | 9/1975 | Moore et al. | 342/132 |
| 4,096,478 | 6/1978 | Chavez | 342/132 |
| 4,241,347 | 12/1980 | Albansese et al. | 342/130 |
| 4,566,011 | 1/1986 | Lewis et al. | 342/201 |

*Primary Examiner*—Daniel T. Pihulic
*Attorney, Agent, or Firm*—Thomas E. McDonnell

[57] ABSTRACT

An MTI with no blind speeds which compensates for antenna scan modulation. This design includes circuitry for generating and transmitting consecutive first, second and third doppler-tolerant FM pulses, wherein the first and third FM pulses have a given dispersion characteristic, and the second FM pulse has a dispersion characteristic which is the complex conjugate of the first and third FM pulses. Circuitry is then provided for receiving and compressing the first, second, and third echos from the first, second, and third pulses, respectively. Finally, a processing circuit is used to effectively add the first and third echo pulses and to subtract twice the second echo pulse from this sum to effect the detection of the moving target.

17 Claims, 2 Drawing Sheets

THREE-PULSE MTI WITHOUT BLIND SPEEDS

BACKGROUND OF THE INVENTION

The present invention relates generally to target detecting radar systems and more particularly to radar systems for detecting targets having a radial velocity relative to the system.

A radar system, in general, includes a transmitter adapted to radiate short duration, high frequency, pulses of electromagnetic energy and a receiver responsive to the echo pulses returned when the radiated pulses impinge upon an object. The information provided by the echo pulses is derived and presented on an indicating device.

A radar system which is adapted to distinguish between fixed objects and moving objects and which applies to the indicating device signals representing only moving targets is referred to as a moving target indicating (MTI) system. Distinction between the moving and the fixed targets is normally attained by utilizing the Doppler effect i.e., the phase change of the echo with respect to the transmitted pulse caused by the radial velocity of the target with respect to the radar system. In contrast, the phase relationship between a transmitted pulse and an echo resulting from a fixed target is the same for successive pulses. The fact that for successive pulses the relative phase of the transmitted pulse and the echo varies when the target is moving, and is constant when the target is fixed, provides a means for distinguishing between fixed and moving targets.

Many prior art MTI systems utilize a two pulse technique to detect moving targets. This technique comprises the transmission of a first pulse followed by a second pulse, and then the subtraction of the echo returns from these two pulses. This subtraction step removes the echoes from fixed targets and slowly moving targets referred to as clutter. A major problem with this technique for clutter cancellation is that "blind-speeds" exist at which no MTI output is produced. "Blind-speeds" occur when the target moves toward or away from the radar system a distance equal to an integral number of half wavelengths of the transmitter carrier frequency during the interval between pulses. A further problem arises due to range ambiguities of the system. This "blind-speed" problem is solved by utilizing oppositely chirped pulses for the two pulse system. This type of design takes advantage of the opposite range-doppler-coupling on up frequency sweeps and down frequency sweep transmissions. When the echos from these oppositely swept pulses are subtracted, the echoes from non-moving targets again appear at the same time after transmission on both pulses and cancel. However, due to the opposite range-doppler-coupling on the two different sweeps, echoes from moving targets couple in opposite directions and thus do not cancel, even if the target velocity is such as to cause a blind-speed.

One of the problems with this type of two-pulse system is that the standard antenna pattern has a sin X/X pattern for scanning. This pattern is shown in FIG. 1 by the curve 10. Assume that each vertical line 12 in the antenna scan pattern 10 represents an expanded chirp pulse. It can be seen that as this antenna pattern 10 is scanned in the direction 14 through a target 16, the echoes from the individual expanded chirp pulses 12 reflected from the target 16 will have different gains. This type of gain modulation caused by the shape of the antenna pattern and the antenna scanning motion is referred to as antenna scan modulation.

From the above, it can be seen that no two successive pulses will have the same amplitude. Thus, successive pulses 12 and 12A reflected from a target 16 which is stationary will come back with the same phase, but will have different amplitudes. Thus, only a very poor clutter cancellation is realized.

This antenna scan modulation caused by different gains as the antenna passes by the fixed target can be obviated to some extent by significantly increasing the number of pulses per scan. Then, each pulse will be very close to its adjacent pulse and will have a very similar gain magnitude to its adjacent pulse. However, there is a certain minimum desired interpulse period required in order to prevent long range echoes from the first pulse in the sequence from arriving at the radar receiver at the same time as short-range echoes from the second pulse. In order to prevent this mixing of echoes from short range clutter on one pulse with long range clutter from previous transmitted pulses the interpulse period is required to be long compared to the time it takes for the radar pulse to travel out to the clutter and back.

It can be seen that with this interpulse period limitation and a large number of transmitted pulses, the antenna scan rate must be very slow. However, there is also a requirement to update the target detection information once approximately every four seconds in order to maintain track.

Thus it can be seen that the radar pulses or echo hits must be widely spaced on the antenna pattern 10. There must be some means for compensating for this difference in gain from pulse-to-pulse in order to cancel clutter. One very complicated prior art system for accomplishing this clutter cancellation is disclosed in U.S. Pat. No. 3,225,349 by Thor. The Thor system discloses the use of four or a higher even number of chirped pulses in FIG. 7 of the reference. One set of adjacent pulses is chirped with a slope of T while a second set of adjacent pulses is chirped with a slope of 2T. Thor then discloses a complicated processing system for effecting this cancellation.

At the present time there is no known method or apparatus for a three pulse chirp MTI system. However, such a three pulse system is clearly the most economical system for compensating for antenna scan modulation.

OBJECTS OF THE INVENTION

Accordingly, it is object of the present invention to compensate for antenna scan modulation by means of a three pulse MTI system.

It is a further object of the present invention to process expanded doppler-tolerant three-pulse sets in an MTI system in order to obtain antenna scan modulation compensation without introducing blind-speeds.

Other objects, advantages, and novel features of the present invention will become apparent from the detailed description of the invention, which follows the summary.

SUMMARY OF THE INVENTION

Briefly, the present invention comprises a moving-target indicator with no blind speeds which compensates for antenna scan modulation. The MTI system comprises a circuit for generating a first, second, and third expanded doppler-tolerant FM consecutive pulses, wherein the first and third FM pulses have a given dispersion characteristic and wherein the second FM pulse has a dispersion characteristic which is the conjugate of the dispersion characteristic for the first and the third FM pulses. Circuitry is also provided for transmitting these first, second, and third doppler-tolerant FM pulses, and for receiving the first, second, and third echo pulses from these transmitted first, second, and third FM pulses, respectively and compressing those echoes. A processing circuit is then provided for effectively adding the first and third echo pulses and subtracting twice the second echo pulse therefrom to thereby detect moving targets while compensating for antenna scan modulation effects.

In a preferred embodiment of the present invention, the receiving and compressing circuitry comprises a single pulse compressor with a first dispersion characteristic having a first output port for providing compressed signal and a second output port for providing signals which are the conjugate of the signals from the first output port. This embodiment further includes a switch for alternately switching in proper sequence the output signals from the first and second output ports to the processing circuit in order to compress the most recently transmitted expanded doppler FM pulse. This preferred embodiment may also be implemented by utilizing a second pulse compressor with a dispersion characteristic which is the conjugate of the first dispersion characteristic. This second pulse compressor would be used to provide the second output port conjugate signals.

DETAILED DESCRIPTION OF THE PREFERRED EMBODIMENT

The present invention discloses a three-pulse MTI processing system. The pulses are expanded doppler-tolerant FM pulses and have dispersion characteristics which effect opposite doppler-coupling to thereby prevent blind-speeds. In essence, it has been discovered in the present invention that by transmitting a set of three expanded doppler-tolerant FM consecutive pulses, with the first and third FM pulses having a given dispersion characteristic, and with the second FM pulse having a dispersion characteristic which is the complex conjugate of the dispersion characteristic for the first and third pulses, and by processing the echoes returns from these three pulses utilizing a specially designed cancelling system, antenna scan modulation can be compensated without introducing blind-speeds. The present invention will be described in the context of linear frequency modulated chirps. However, it should be noted that any expanded doppler-tolerant FM pulse may be utilized to implement this system.

Figure 2:
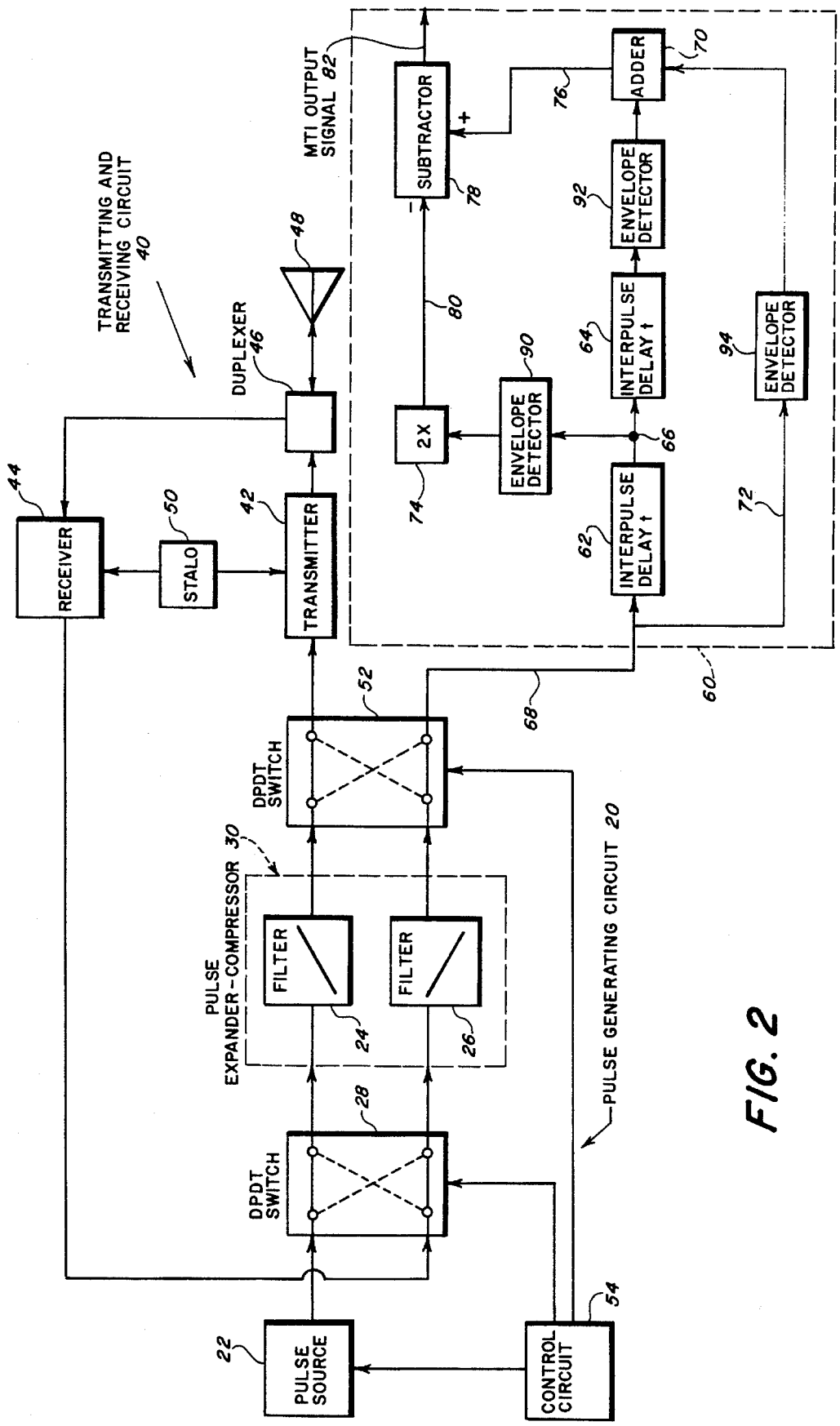
FIG. 2 is a schematic block diagram of one embodiment of the present invention.

FIG. 2 shows an MTI system which may be utilized to implement the present invention. This moving target indicating radar system includes a pulse generating circuit 20 which generates phase-modulated pulses in groups of three at a pulse-repetition frequency sufficiently low that transmitted, echoes of only one pulse from each group are received at a time. Typically, the interpulse periods used are on the order of three milliseconds to insure that all of the echoes from detectable clutter are received before transmitting the second pulse in the three pulse group. A pulse expander-compressor circuit 30 is provided for expanding the pulses from the pulse source 20 to form expanded doppler-tolerant FM pulses and for compressing echo returns. A transmitting and receiving circuit 40 is provided for transmitting these three-pulse groups and receiving the echoes therefrom. Finally, a specially designed processing circuit 60 is provided for cancelling clutter while compensating for antenna scan modulation.

As noted previously, the present invention will be described in the context of linear FM chirps. Thus, the first and last pulses to be generated will be linear-frequency-modulation-coded pulses with a given dispersion characteristic or slope. The middle pulse in this three pulse group is a linear-frequency-modulation-coded pulse with a phase-slope dispersion which is the negative of the first and the third pulse dispersions. By way of example, for the first and third pulses in the group the lower frequencies in the pulse may be adjacent to the leading edge of the pulse while the higher frequencies are adjacent to the trailing edge of the pulse (positive phase-slope dispersion). The middle or second pulse in the three pulse group may then have its higher frequencies adjacent to the leading edge of the pulse and its lower frequencies adjacent to the trailing edge of the pulse (negative phase-slope dispersion).

While the pulse-generating circuit may take a variety of forms, conveniently it may take the form shown in FIG. 2 of the pulse source 22, a pair of filters 24 and 26 forming a pulse expander-compressor, and switch 28 for switching the output of the pulse source 22 to one or the other of the filters 24 and 26. The filters 24 and 26 may comprise, for example, a pair of dispersive delay filters having identical bandwidths, center frequencies, and time-bandwidth products. In the present example, the filter 24 has a delay dispersion in order to yield a phase-slope dispersion on the pulse. The second filter 26 has a phase-slope dispersion which is the negative or the complex conjugate of the dispersion of filter 24. In the present example, these slope dispersions are linear-slope dispersions. Note that the delay dispersion of a filter is said to be positive when the phase delay imposed upon the higher frequencies of the pulse passed through the filter is greater than the phase delay imposed upon the lower frequencies. The delay dispersion of such a filter and the phase-dispersive characteristics of the pulse which it produces are illustrated diagrammatically as shown in FIG. 2 by means of the diagonal line having a positive slope in filter 24. Likewise, the delay dispersion is said to be negative when the phase delay imposed upon the lower frequencies is greater than the phased delay imposed upon the higher frequencies. The delay dispersion of such a filter and the phase-dispersive characteristics of the pulse which it produces (i.e., negative phase slope dispersion) are illustrated diagrammatically as shown by the diagonal line having a negative slope in the filter 26.

While the transmitting and receiving circuit 40 may take a variety of forms, conveniently it may take the form shown in the figure of a transmitter 42 and a receiver 44 connected by a duplexer 46 to an antenna 48. A stable local oscillator 50 is connected to both the transmitter 42 and the receiver 44. A switch 52 connects the output from the pulse expander-compressor 30 through to the transmitter 42 and also to the processing circuit 60. In essence, the switch 52 switches the input of the transmitter 42 between the outputs of the filters 24 and 26 when pulses are transmitted. The switch 28 functions to switch the output of the receiver between the inputs to the filters 24 and 26 when echoes are received.

A conventional control circuit 54 is common to the pulse-generating circuit 20, the transmitting and receiving circuit 40 and the switches 28 and 52. In essence, this control circuit 54 may simply be comprised of a clock generator for generating the appropriate clock frequencies to drive the system. In a preferred embodiment, this system should be clocked at the Nyquist rate for the bandwidth of the radar.

The switch 28 may comprise, for example a double-pole, double-throw electronic switch having a first pair of contacts connected to the pulse source 22 and to the receiver 44, respectively, and a second pair of contacts connected to the filters 24 and 26, respectively. A control input line is also connected to the control circuit 54. The switch 52 may comprise, for example, a double-pole, double-throw electronic switch having a first pair of contacts connected to the filters 24 and 26, respectively, and a second pair of contacts connected to the transmitter 42 and the processing circuit 60, respectively. A control input signal is also applied to this switch from the control circuit 54.

The processing circuit 60 for the present invention is specially designed to add the first and third echo pulses obtained from the pulse expander-compressor 30 and to subtract twice the second echo pulse therefrom to thereby detect moving targets while compensating for antenna scan modulation effects.

There are a variety of configurations which may be utilized to implement the foregoing cancellation logic. The embodiment shown in FIG. 2 shows one such configuration. In this embodiment, a first interpulse delay element 62 and a second interpulse delay element 64 are connected in series with a first node 66 therebetween. The first delay element is connected to receive the output from the switch 52 on line 68. The first and second delay elements each have a delay approximately equal to the interpulse period for the MTI.

The first and the third echo pulses are added together by applying the output from the second interpulse delay element 64 to an adder 70 in conjunction with the echo pulse at the input to the first interpulse delay element 62 via the line 72. Twice the second echo pulse is obtained by applying the echo pulse from the node 66 to a 2× multiplier 74. The subtraction cancellation is obtained by applying the sum of the first and third pulses from the adder 70 on line 76 to the positive input of a subtractor 78 while applying twice the second echo pulse from the multiplier 74 on line 80 to the negative input of the subtractor 78. The clutter cancelled MTI output signal is then obtained on line 82 at the output of the subtractor 78.

The foregoing circuit operates in the following manner. The control circuit 54 synchronizes the operation of the pulse source 22 and the switches 28 and 52. The operation begins with the pulse source 22 generating short-duration radio frequency drive pulses in groups of three at a pulse repetition frequency sufficiently low that when transmitted, echoes of only one pulse of each group are received at a time.

When the initial pulse of each group is generated, the switches 22 and 52 adopt their first position, indicated by the solid lines, wherein the filter 24 is connected between the output of the pulse source 22 and the input of the transmitter 42, and the filter 26 is connected between the output of the receiver 44 and the input of the processing 60. The filter 24 operates to generate from this initial drive pulse an elongated expanded version of the pulse having the first phase modulation dispersion. The elongated initial pulse is converted to the carrier frequency of the transmitter 42 by heterodyning with the stable local oscillator 50 and is coupled to the antenna 48 through the duplexer 46. The returning echo pulses resulting from the impingement of the radiated initial pulse upon a target passes from the common antenna 48 through the duplexer 46 to the receiver 44 where it is restored to its original carrier intermediate frequency by heterodyning with the stable local oscillator 50. The pulse is then applied through the switch 28 to filter 26. The filter 26 is phased-matched to this initial pulse. That is, it has a delay dispersion whose sign is the negative of the phase-slope dispersion of the initial pulse. Thus, the filter 26 collapses or compresses the various phase components of the initial pulse into its original short duration form (the trailing edge tends to overtake the leading edge), and the reconstituted initial pulse is fed to the processing circuit 60.

When the second pulse of each group is generated, the switches 28 and 52 adopt their second position, indicated by the dotted lines. In this switch position, the filter 26 is connected between the output of the pulse source 22 and the input of the transmitter 42, and the filter 24 is connected between the output of the receiver 44 and the input of the processing circuit 60. The filter 26 generates from this second drive pulse of the three pulse group an elongated version of the pulse having the second phase modulation which is the complex conjugate of the first phase modulation dispersion. Again, this elongated or second pulse is converted to the carrier frequency of the transmitter 42 by heterodyning with the stable local oscillator 50 and is coupled to the antenna 48 through the duplexer 46. The returning echo pulse resulting from the impingement of the radiated second pulse upon a target passes from the common antenna 48 through the duplexer 46 to the receiver 44. The receiver again restores this pulse to its original intermediate frequency carrier by heterodyning with the stable local oscillator frequency from the STALO 50. This second pulse is applied through the switch 28 to the filter 24. The filter 24 is again phase-matched to this second pulse. Thus, it has a delay dispersion whose sign is the negative or the complex conjugate of the phase-slope dispersion of the second pulse. Accordingly, the filter 24 collapses or compresses the various phase components of the terminal pulse into its original short duration form. The reconstituted second pulse echo is fed to the processing circuit 60 a time T after the compressed first pulse was fed to the circuit 60. Since the pulse repetition frequency is sufficiently low that echoes of only one pulse are received at a time, the filters 24 and 26 are never phase-mismatched to the pulses applied at their inputs.

When the third pulse of the three pulse group is generated, the switches 28 and 52 have their first position, indicated by the solid lines. Thus, this pulse has the first phase dispersion characteristic as shown in the filter 24. This pulse is expanded, transmitted, received, and compressed in the same manner as the first pulse in the three pulse group. However, note that the compressed third pulse echo is fed to the processing circuit 60 at a time 2T after the compressed first pulse was fed to the circuit 60.

The processing circuit 60 appropriately delays and then combines these three pulses in order to cancel out fixed target information and to derive moving target information. Specifically, a three pulse group of returned echo pulses resulting from the impingement of the three pulse group upon a target will exhibit a relative time shift between the first and second pulses of X and between the second and third pulses of Y. If the pulses represent reflections from a stationary target, then X=Y=T. Thus, the pulses at the output 82 after appropriate manipulation and delay, are coincident in time, and the subtractor 78 produces no output signal. However, if the pulses represent reflections from a moving target, then X and Y are either greater or less than T due to range doppler coupling and the pulses at the output 82 are not time coincident. In essence, these echoes from moving targets compress at different times on the up and down chirp transmissions and do not cancel in the subtractor 78. The output response on line 82 for a moving target would have, for example, a positive pulse followed by an equal magnitude negative pulse. The separation between the positive and negative components is directly proportional to the target velocity, and the true target range is the mid-point between the positive and negative pulse components.

The radar transmits, for example, an up-chirp wave form and compresses echoes received for a time T known as the interpulse period. The radar then transmits a down-chirp waveform and compresses echoes therefrom for a second period T. The third pulse transmitted is again an up-chirp waveform whose echoes are compressed for a time T. Three-pulse echo groups then drive the two-stage delay formed by the two delays T equal to the radar's interpulse period. This three-pulse group is then processed by adding the input into the first delay stage to the output of the last delay stage and then subtracting twice the signal between the two delay stages from the aforementioned sum.

It should be noted that the present processing circuit 60 can operate on signals which are either detected or undetected. If the signal is undetected, then the subtraction operation in the subtractor 78 is a coherent subtraction. However, it may be desirable to remove all phase information via the use of envelope detectors prior to application to the subtractor 78. Such envelope detection could be implemented simply by adding an envelope detector 90 in the line from the node 66 to the multiplier 74, an envelope detector 92 after the output from the second delay element 64, and an envelope detector 94 in the line 72.

Figure 1:
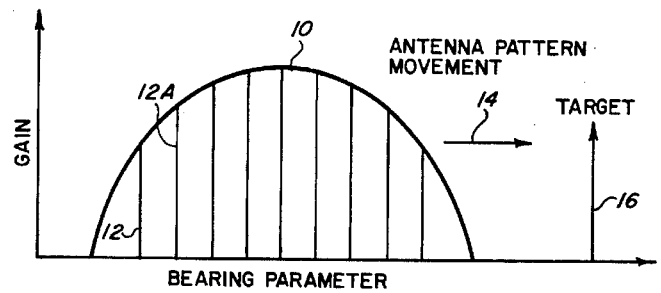
FIG. 1 is a graph of a typical sin X/X antenna gain pattern.
Figure 3:
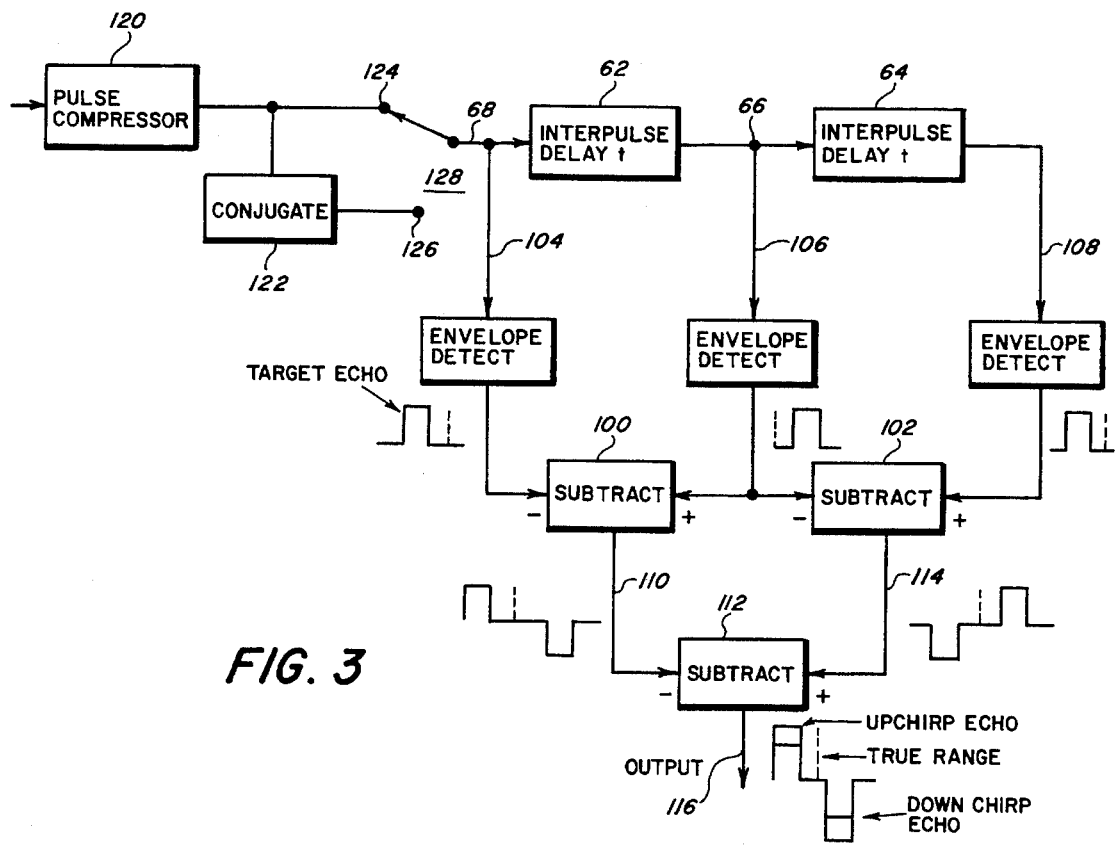
FIG. 3 is a schematic block diagram of a second embodiment of the processing circuit shown in FIG. 2.

FIG. 3 shows a second embodiment of the processor circuit 60. Again, a first delay element 62 and a second delay element 64 are connected in series with a node 66 therebetween. However, in this design a first subtractor 100 is provided for subtracting the third pulse echo from the second echo pulse, while a second subtractor 102 is provided for subtracting the second echo pulse from the first echo pulse. The foregoing operation is accomplished by taking the third echo pulse at the input to the first interpulse delay element 62 and providing that third echo pulse via the line 104 to the negative input of the subtractor 100. Likewise, the second echo pulse is taken from the node 66 via the line 106 and is applied to the positive input of the subtractor 100, and to the negative input of a subtractor 102. Finally, the first echo pulse is applied from the output from the second interpulse delay element 64 via the line 108 to the positive input of the subtractor 102. The output from the subtractor 100 is then applied on the line 110 to the negative input of a third subtractor 112. The output from the subtractor 102 is then applied via the line 114 to the positive input of the subtractor 112. The above described processing yields (1–2)–(2–3), which in essence, is the same as adding the first and third pulses and subtracting twice the second pulse from this sum. The MTI output, compensated for any antenna gain change due to scan between pulses, is obtained from the subtractor 112 on line 116.

Note that the compressor-expander 30 may be replaced by a single pulse compressor 120 and a conjugator 122 as shown in FIG. 3. The pulse compressor 120 would have a given dispersion characteristic which would provide compressed pulses to terminal 124. The conjugator 122 conjugates the output from this pulse compressor 120 and provides a conjugated output at terminal 126. The switch 128 then operates to alternately connect the processing circuit 60 to one or the other of the terminals 124 and 126 in accordance with the dispersion characteristic of the transmitted signal. Note, that this one pulse compressor configuration is an economical alternative to the pulse-compressor 30 shown in FIG. 2. Only a single switch 128 has been shown in FIG. 3 for purposes of illustration. Note, however, that a double-pole double-throw switch would be utilized to implement both the transmission and the processing operation for this MTI.

The present design has been set forth, by way of example, in the context of linear chirp pulses. However any doppler-tolerant polyphase coded pulses could be utilized such as, for example, the step approximation to linear frequency modulation code, the Frank code, the P1 code, the P2 code, the P3 code, the P4 code, and the PP3 and PP4 codes. For further information on the Frank code, the P1 and the P2 codes, see the reference "A New Class Of Polyphase Pulse Compression Codes and Techniques" IEEE Transactions on Aerospace and Electronics Systems, Volume AES-17, No. 3, May 1981. For further information on the P3 and P4 codes, see NRL Report 8541 by B. L. Lewis and F. F. Kretschmer, Jr., dated Nov. 2, 1981, entitled, "Linear Frequency Modulation Derived Polyphase Pulse-Compression Codes and an Efficient Digital Implementation." For further information on the PP3 and PP4 codes, see U.S. application Ser. No. 06/512,045, filed 8 Jul. 1983, entitled, "Polyphase Coded Pulse Compressors with Real Autocorrelation Function," by Lewis and Kretschmer, Jr., now U.S. Pat. No. 4,566,011.

The present invention has disclosed a three-pulse MTI system with no blind-speeds for compensating for antenna scan modulation effects. The present design effects good clutter cancellation in an economical fashion.

Obviously many modificatons and variations of the present invention are possible in light of the above teachings. It is therefore to be understood that within the scope of the appended claims the invention may be practiced otherwise than as specifically described.

What is claimed and desired to be secured by Letters Patent of the United States is:

1. A moving-target indicator with no blind speeds which compensates for antenna scan modulation:

means for generating a first, second, and third expanded doppler-tolerant FM consecutive pulses, wherein said first and third FM pulses have a given identical dispersion characteristic, and wherein said second FM pulse has a dispersion characteristic which is the complex conjugate of the dispersion characteristic for said first and third FM pulses;

means for transmitting said first, second and third doppler-tolerant pulses;

means for receiving a first, second, and third echo pulses from said transmitted first, second, and third FM pulses, respectively, and compressing those echoes; and processing means for effectively adding the first and third echo pulses and subtracting twice the second echo pulse therefrom to thereby detect moving targets while compensating for antenna scan modulation effects.

2. An MTI as defined in claim 1, wherein said processing means comprises:

a first delay element and a second delay element connected in series with a first node therebetween, said first delay element connected to receive the output from said echo receiving means, said first and second delay elements each having a delay equal to the interpulse period for said MTI:

means for adding the output signal from said echo receiving means to the delayed output signal from said second delay element; and means for subtracting twice the signal at said first node from the output signal from said adding means.

3. An MTI as defined in claim 2, wherein said pulse generating means comprise means for generating a doppler-tolerant chirp waveform.

4. An MTI as defined in claim 3, further comprising means for envelope detecting the input signals to said subtracting means.

5. An MTI as defined in claim 2, wherein said receiving and compressing means comprises a single pulse compressor with a first dispersion characteristic having a first output port for providing compressed signals, and a second output port for providing signals which are the complex conjugate of the signals from the first output port; and a switch for alternately switching in proper sequence the output signals from said first and second output ports to said processing means.

6. An MTI as defined in claim 1, wherein said processing means comprises a first delay element and a second delay element connected in series with a first node therebetween, said first delay element connected to receive the output from said echo receiving means, said first and second delay elements each having a delay equal to the interpulse period of said MTI;

a first subtractor for subtracting the output signal from said echo receiving means from the signal at said first node;

a second subtractor for subtracting the signal at said first node from the output signal from said second delay element; and a third subtractor for subtracting the output signal from said first subtractor from the output signal from said second subtractor.

7. An MTI as defined in claim 6, wherein said receiving and compressing means comprises a single pulse compressor with a first dispersion characteristic with a first output port for providing compressed signals, and a second output port for providing signals which are the complex conjugate of the signals from the first output port; and a switch for alternately switching in proper sequence the output signals from said first and second ports to said processing means.

8. An MTI as defined in claim 7, wherein said pulse generating means comprise means for generating a doppler-tolerant chirp waveform.

9. An MTI as defined in claim 8, further comprising means for envelope detecting the input signals to said first and second subtractors.

10. An MTI as defined in claim 1, wherein said receiving and compressing means comprises a single pulse compressor with a first dispersion characteristic with a first output port for providing compressed signals, and a second output port for providing signals which are the complex conjugate of the signals from first output port; and a switch for alternately switching in the proper sequence the output signals from said first and second ports to said processing means.

11. An MTI as defined in claim 1, wherein said receiving and compressing means comprises:

a first pulse compressor with a first dispersion characteristic and having a first output port for providing compressed signals;

a second pulse compressor with a second dispersion characteristic and having a second output port; and a switch for alternately switching in the proper sequence the output signals from said first and second output ports to said processing means.

12. A method for detecting moving targets with no blind speeds which compensates for antenna scan modulation comprising the steps of:

generating a first, second, and third consecutive doppler-tolerant FM pulses, wherein said first and third FM pulses have a given dispersion characteristic, and wherein said second FM pulse has a dispersion characteristic which is the complex conjugate of the dispersion characteristic of said first and third FM pulses;

transmitting said first, second, and third doppler-tolerant FM pulses consecutively;

receiving a first, second, and third echo pulses from said transmitted first, second, and third FM pulses, respectively, and compressing those echo pulses;

adding the first and third echo pulses together to obtain a first sum; and subtracting twice the second echo pulse from said first sum to thereby detect moving targets while compensating for antenna scan modulation effects.

13. A method as defined in claim 12, wherein said receiving and compressing step comprises the steps of compressing with a first dispersion characteristic said received signal and providing a first output port;

conjugating the compressed signal and providing a second output port; and switching alternately the signals from said first and second ports to be added and subtracted.

14. A method as defined in claim 12, wherein said adding and subtracting steps include the steps of:

delaying received echo pulses by a first delay which is approximately equal to the interpulse period for the MTI;

delaying the output from the first delaying step by a second delay which is approximately equal to the interpulse period for the MTI;

adding the output signal from said second delaying step to the output signal from said receiving and compressing step to obtain a first sum; and subtracting twice the output signal from said first delaying step from said first sum.

15. A method for detecting moving targets with no blind speeds which compensates for antenna scan modulation comprising the steps of:

generating a first, second, and third consecutive doppler-tolerant FM pulses, wherein said first and third FM pulses have a given dispersion characteristic, and wherein said second FM pulse has a dispersion characteristic which is the complex conjugate of the dispersion characteristic of said first and third FM pulses;

transmitting said first, second, and third doppler-tolerant FM pulses consecutively;

receiving a first, second, and third echo pulses from said transmitted first, second, and third FM pulses, respectively, and compressing those echo pulses;

subtracting the third echo pulse from the second echo pulse to obtain a first difference;

subtracting the second echo pulse from the first echo pulse to obtain a second difference; and subtracting the first difference from the second difference to detect moving targets while compensating for antenna scan modulation effects.

16. A method as defined in claim 15, wherein said receiving and compressing step comprises the steps of compressing with a first dispersion characteristic said received signal and providing a first output port for providing compressed signals;

conjugating the compressed signals and providing a second output port; and switching alternately the signals from said first and second output ports to be added and subtracted.

17. A method as defined in claim 15, wherein said first and second difference subtraction steps include the steps of:

delaying the received echo pulses by a first delay which is approximately equal to the interpulse period for the MTI;

delaying the output from the first delaying step by a second delay which is approximately equal to the interpulse period for the MTI;

subtracting the output signal from said receiving and compressing step from the output signal from said first delaying step to obtain said first difference; and subtracting the output signal from said first delaying step from the output signal from said second delaying step to obtain said second difference.

* * * * *